(12) United States Patent
Suzuki et al.

(10) Patent No.: US 9,266,403 B2
(45) Date of Patent: Feb. 23, 2016

(54) VEHICLE HEIGHT ADJUSTMENT APPARATUS

(71) Applicant: Aisin Seiki Kabushiki Kaisha, Kariya-shi (JP)

(72) Inventors: Takanori Suzuki, Nisshin (JP); Atsuto Ogino, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/548,762

(22) Filed: Nov. 20, 2014

(65) Prior Publication Data

US 2015/0151602 A1 Jun. 4, 2015

(30) Foreign Application Priority Data

Nov. 29, 2013 (JP) .................................. 2013-247946

(51) Int. Cl.
*B60G 17/056* (2006.01)
*B60G 17/017* (2006.01)
*B60G 17/052* (2006.01)

(52) U.S. Cl.
CPC ............ *B60G 17/056* (2013.01); *B60G 17/017* (2013.01); *B60G 17/0525* (2013.01); *B60G 17/0565* (2013.01); *B60G 2202/152* (2013.01); *B60G 2400/204* (2013.01); *B60G 2400/252* (2013.01); *B60G 2400/952* (2013.01);
(Continued)

(58) Field of Classification Search
CPC .............. B60G 17/056; B60G 17/017; B60G 17/0565; B60G 17/0525; B60G 2400/252; B60G 2800/202; B60G 2500/202; B60G 2500/2021; B60G 2500/326; B60G 2202/152; B60G 2400/952; B60G 2400/204
See application file for complete search history.

(56) References Cited

U.S. PATENT DOCUMENTS 5,193,849 A 3/1993 Holzmann
6,098,995 A * 8/2000 Danis ......................... 280/6.152
(Continued)

FOREIGN PATENT DOCUMENTS

DE 10 2008 062 636 A1 9/2009
EP 1 693 234 A2 8/2006
(Continued)

OTHER PUBLICATIONS

Extended European Search Report issued May 29, 2015 in Patent Application No. 14194346.4.

*Primary Examiner* — Drew Brown
(74) *Attorney, Agent, or Firm* — Oblon, McClelland, Maier & Neustadt, L.L.P.

(57) ABSTRACT

A vehicle height adjustment apparatus includes: vehicle height adjustment units respectively provided to correspond to wheels of a vehicle body, and adjusting a vehicle height in response to the supply and discharge of a working fluid; a supply source of the working fluid; opening and closing valves interposed between the vehicle height adjustment units and the supply source; and a control unit adjusting a vehicle height for each of the vehicle height adjustment units to at least one of a first vehicle height suitable for at least one of boarding and deboarding, and a second vehicle height suitable for travelling, wherein when the control unit acquires preparation information indicative of the transition of a preparation state to at least one of boarding and deboarding preparation states, the control unit adjusts the vehicle height adjustment units from the second vehicle height to the first vehicle height.

13 Claims, 7 Drawing Sheets

(52) U.S. Cl.
CPC ... *B60G2500/202* (2013.01); *B60G 2500/2021* (2013.01); *B60G 2500/326* (2013.01); *B60G 2800/202* (2013.01)

(56) References Cited

U.S. PATENT DOCUMENTS

| | | | |
|---|---|---|---|
| 8,413,997 B1* | 4/2013 | Coombs et al. | 280/6.152 |
| 2002/0136645 A1 | 9/2002 | Folchert et al. | |
| 2003/0193149 A1* | 10/2003 | Russell et al. | 280/6.152 |
| 2005/0093265 A1* | 5/2005 | Niaura et al. | 280/124.16 |
| 2006/0142916 A1 | 6/2006 | Onuma et al. | |
| 2007/0120334 A1* | 5/2007 | Holbrook | 280/6.157 |
| 2014/0346763 A1* | 11/2014 | Kane et al. | 280/790 |

FOREIGN PATENT DOCUMENTS

| | | |
|---|---|---|
| JP | 2004-345473 A | 12/2004 |
| JP | 2006-143121 | 6/2006 |

\* cited by examiner

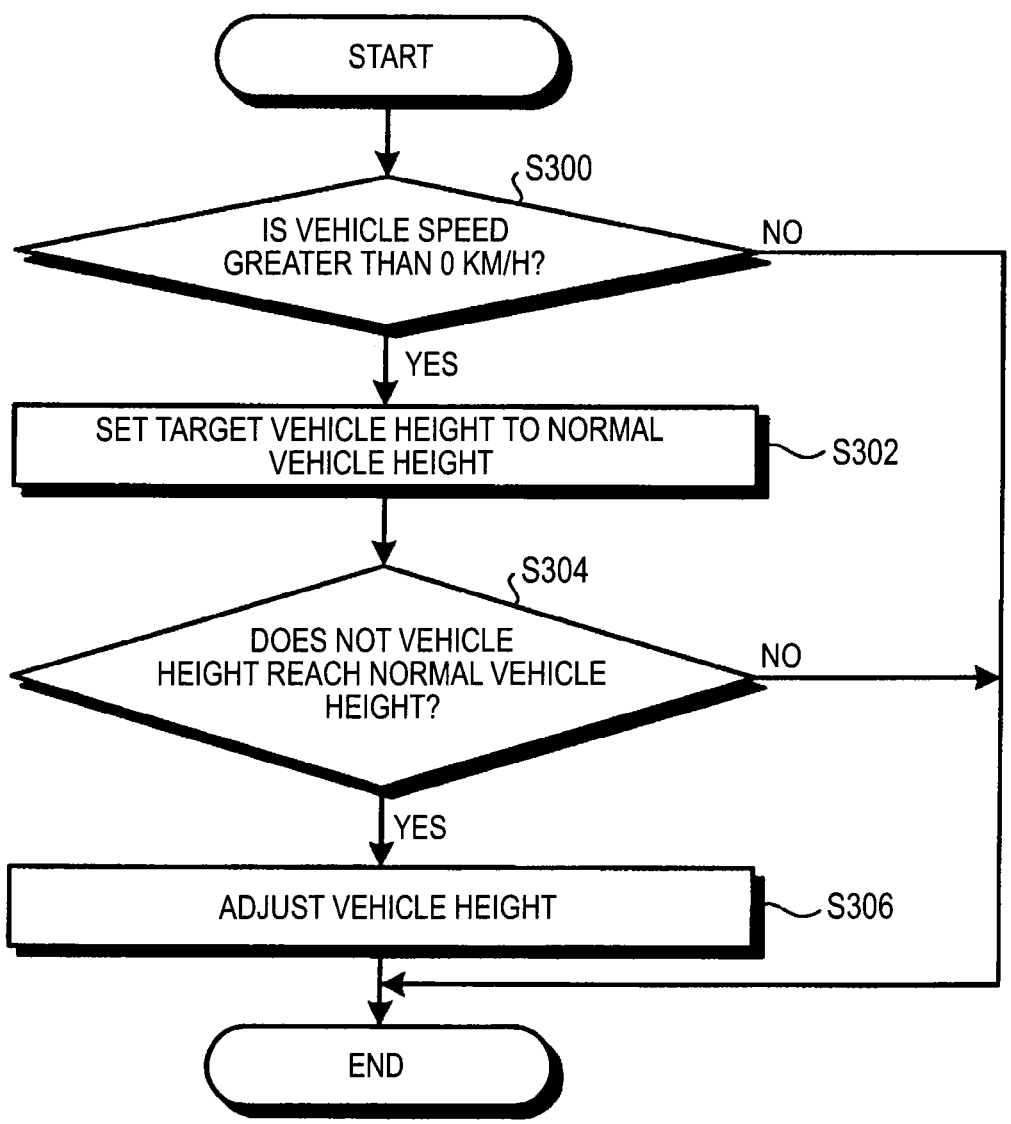

VEHICLE HEIGHT ADJUSTMENT APPARATUS

CROSS REFERENCE TO RELATED APPLICATIONS

This application is based on and claims priority under 35 U.S.C. §119 to Japanese Patent Application 2013-247946, filed on Nov. 29, 2013, the entire contents of which are incorporated herein by reference.

TECHNICAL FIELD

This disclosure relates to a vehicle height adjustment apparatus.

BACKGROUND DISCUSSION

In the related art, there is provided a vehicle equipped with a suspension that includes air springs using compressed air and the like. There is also a vehicle equipped with a vehicle height adjustment apparatus using the air springs. There is a so-called closed type vehicle height adjustment apparatus. This type of vehicle height adjustment apparatus increases a vehicle height by supplying high-pressure air stored in a pressure tank to the air springs that change a suspension state of each wheel. The vehicle height adjustment apparatus decreases the vehicle height by discharging the high-pressure air from the air springs and returning the high-pressure air back to the pressure tank. Among the vehicle height adjustment apparatuses using the air springs, there is a vehicle height adjustment apparatus that captures an image of an unspecified person using a camera, acquires physical information, age information, gender information, dress information, physical handicap information, and the like, and adjusts the vehicle height based on the captured images so as to provide a vehicle height suitable for the unspecified person who boards and deboards the vehicle. JP 2006-143121 is an example of the related art.

However, when a vehicle height control operation is performed using the captured images so as to improve boarding and deboarding characteristics, it is necessary to newly provide the camera and an image processing apparatus, and the vehicle height adjustment apparatus increases in size. In addition, it is necessary to analyze an image process, and thus a vehicle height control process becomes complicated. As a result, the vehicle height adjustment apparatus increases in cost.

SUMMARY

Thus, a need exists for a vehicle height adjustment apparatus which is not susceptible to the drawback mentioned above.

An aspect of this disclosure is directed a vehicle height adjustment apparatus including a plurality of vehicle height adjustment units that are respectively provided to correspond to wheels of a vehicle body, and adjust a vehicle height in response to the supply and discharge of a working fluid; a supply source of the working fluid; a plurality of opening and closing valves that are interposed between the vehicle height adjustment units and the supply source; and a control unit that adjusts a vehicle height for each of the vehicle height adjustment units to at least one of a first vehicle height suitable for at least one of boarding and deboarding, and a second vehicle height suitable for travelling. When the control unit acquires preparation information indicative of the transition of a preparation state to at least one of a boarding preparation state and a deboarding preparation state, the control unit adjusts the vehicle height adjustment units from the second vehicle height to the first vehicle height. According to this embodiment, it is possible to improve boarding and deboarding characteristics via a simple control operation in which the vehicle height adjustment units are adjusted from the second vehicle height to the first vehicle height, upon the acquisition of the preparation information indicative of a state (boarding preparation state or deboarding preparation state) in which an occupant prepares to board a vehicle, or the occupant prepares to deboard the vehicle.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a flowchart illustrating how the vehicle height adjustment apparatus according to the embodiment controls a vehicle height to return back to a travelling vehicle height.

DETAILED DESCRIPTION

Hereinafter, an exemplary embodiment of this disclosure will be disclosed. The configuration of the embodiment illustrated hereinafter, and the action and result (effects) brought by the configuration are only an example. This disclosure can be realized using configurations other than the configuration disclosed in the following embodiment, and various effects (including secondary effects as well) can be obtained by a basic configuration.

Figure 1:
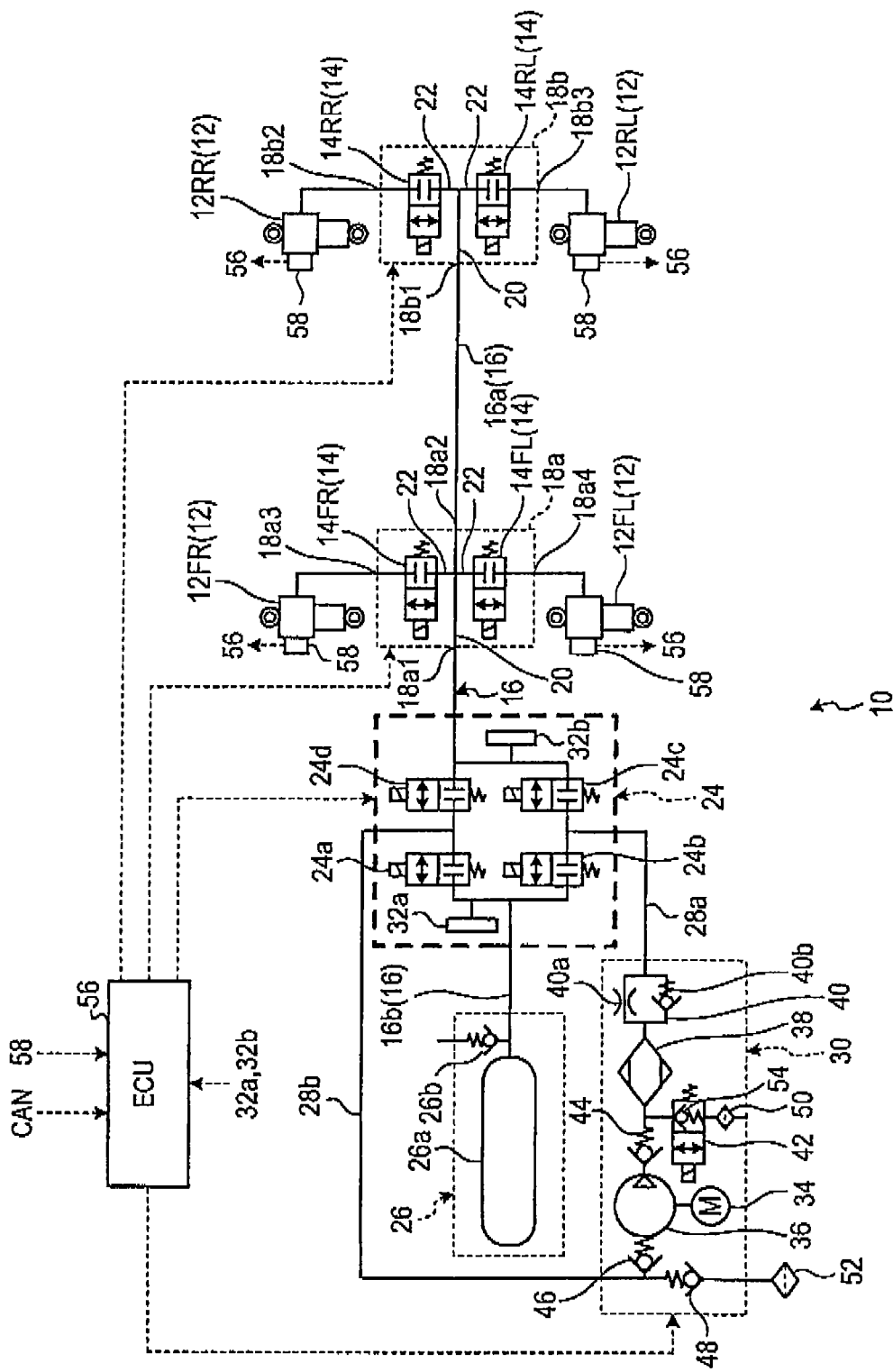
FIG. 1 is a diagram illustrating the configuration of a vehicle height adjustment apparatus according to an embodiment, and illustrates a non-flowing state of a working fluid.

FIG. 1 is a diagram illustrating the configuration of a vehicle height adjustment apparatus 10 according to the embodiment, and illustrates a non-flowing state of a working fluid.

Air springs 12FR, 12FL, 12RR, 12RL (hereinafter, also simply referred to as an "air spring 12" when it is not necessary to distinguish the air springs 12FR, 12FL, 12RR, 12RL therebetween) are respectively connected to the wheels of a vehicle which are not illustrated, and function as vehicle height adjustment units. When the working fluid (for example, air) is supplied to or discharged from the air spring 12, the air spring 12 changes a suspension state of the wheel with respect to a vehicle body of the vehicle. The air spring 12 absorbs the vibration of the vehicle, using the elasticity of compressed air sealed in the air spring 12. The air springs 12FR and 12FL may be referred to as front vehicle height adjustment units. The air springs 12RR and 12RL may be referred to as rear vehicle height adjustment units. A well-known structure can be used in the air spring 12. The air spring 12 absorbs tiny vibrations better than a metallic spring because the air spring 12 uses the elasticity of air. It is possible to maintain a constant vehicle height, adjust the vehicle height to a desired height, or change a spring constant to a desired value by controlling air pressure.

The air springs 12FR and 12FL which are the front vehicle height adjustment units are connected to a main flow passage 16 via respective vehicle height adjustment valves 14FR and 14FL, with the working fluid flowing through the main flow passage 16. Similarly, the air springs 12RR and 12RL which are the rear vehicle height adjustment units are connected to the main flow passage 16 via respective vehicle height adjustment valves 14RR and 14RL, with the working fluid flowing through the main flow passage 16. The vehicle height adjustment valves 14FR, 14FL, 14RR, and 14RL may be simply referred to as a "vehicle height adjustment valve 14" when it is not necessary to distinguish the vehicle height adjustment valves 14FR, 14FL, 14RR, and 14RL therebetween. In the embodiment, the air spring 12 and the vehicle height adjustment valve 14 may be collectively referred to as a vehicle height adjustment unit.

In the embodiment, the vehicle height adjustment valves 14FR and 14FL are disposed by being embedded in a flow passage block made of metal, resin, or the like, and form a front wheel valve unit 18a. Similarly, the vehicle height adjustment valves 14RR and 14RL are disposed by being embedded in the flow passage block, and form a rear wheel valve unit 18b. In another embodiment, the vehicle height adjustment valves 14 may be disposed separately from each other. In this case, the degree of freedom in the layout of the vehicle height adjustment valve 14 improves. The four vehicle height adjustment valves 14 may be integrated into one unit. In this case, it is possible to reduce the number of components by integrating the four vehicle height adjustment valves 14 into one unit.

As illustrated in FIG. 1, each of the front wheel valve unit 18a and the rear wheel valve unit 18b is formed as a separate unit, and the front wheel valve unit 18a can be disposed close to the front wheels. As a result, it is possible to reduce the length of a flow passage tube disposed from the front wheel valve unit 18a to each of the respective air springs 12 of the front wheels, compared to when the entirety of the vehicle height adjustment valves 14 are integrated into one unit. Similarly, it is possible to dispose the rear wheel valve unit 18b close to the rear wheels, and reduce the length of a flow passage tube disposed from the rear wheel valve unit 18b to each of the respective air springs 12 of the rear wheels, compared to when the entirety of the vehicle height adjustment valves 14 are integrated into one unit. As a result, it is possible to facilitate the routing of the flow passage tubes, and reduce a potential risk such as damage of the flow passage tubes by reducing the length of the flow passage tubes.

A first port 18a1 is formed in one end surface of the front wheel valve unit 18a, and is connected to the main flow passage 16, and a main flow passage channel 20 is formed inside the front wheel valve unit 18a so as to pass through the front wheel valve unit 18a, with the first port 18a1 being one end of the main flow passage channel 20, and a second port 18a2 being the other end of the main flow passage channel 20. Two secondary flow passage channels 22 are formed inside the front wheel valve unit 18a so as to branch off from the main flow passage channel 20. One end of the vehicle height adjustment valve 14FR is connected to one of the secondary flow passage channels 22, and the other end of the vehicle height adjustment valve 14FR is connected to the air spring 12FR via a third port 18a3. Similarly, one end of the vehicle height adjustment valve 14FL is connected to the other secondary flow passage channel 22, and the other end of the vehicle height adjustment valve 14FL is connected to the air spring 12FL via a fourth port 18a4.

A main communication flow passage 16a (the main flow passage 16) is connected to the second port 18a2. The main communication flow passage 16a is connected to a first port 18b1 of the rear wheel valve unit 18b. The main flow passage channel 20 is formed inside the rear wheel valve unit 18b so as to have the first port 18b1 as one end of the main flow passage channel 20. Two secondary flow passage channels 22 are also formed inside the rear wheel valve unit 18b so as to branch off from the main flow passage channel 20. One end of the vehicle height adjustment valve 14RR is connected to one of the secondary flow passage channels 22, and the other end of the vehicle height adjustment valve 14RR is connected to the air spring 12RR via a second port 18b2. One end of the vehicle height adjustment valve 14RL is connected to the other secondary flow passage channel 22, and the other end of the vehicle height adjustment valve 14RL is connected to the air spring 12RL via a third port 18b3.

FIG. 1 illustrates an example in which the front wheel valve unit 18a adopts four ports, and the rear wheel valve unit 18b adopts three ports, but for example, the rear wheel valve unit can adopt four ports similar to the front wheel valve unit. When the rear wheel valve unit 18b adopts four ports similar to the front wheel valve unit 18a, a port corresponding to the second port 18a1 is sealed with a plug cap (blind cap). In this case, it is possible to reduce the number of the types of components, and the design costs by using a common valve unit for the front and rear wheel valve units.

The same type of opening and closing valve can be used in the vehicle height adjustment valve 14 (14FR, 14FL, 14RR, 14RL), and for example, the vehicle height adjustment valve 14 has an ON/OFF controlled solenoid and a spring. Any of the control valves can be a normally closed electro-magnetic control valve that is closed when the solenoid of the control valve is not energized.

The main flow passage 16 is connected to a pressure tank 26 (supply source of the working fluid) via a circuit valve block 24 and a tank connection main flow passage 16b. The circuit valve block 24 is connected to an outlet of a compressor unit 30 via a compressor outlet flow passage 28a. The circuit valve block 24 is connected to an inlet of the compressor unit 30 via a compressor inlet flow passage 28b. The circuit valve block 24 is formed as a valve body block that includes a plurality of the opening and closing valves, for example, four opening and closing valves. Specifically, the circuit valve block 24 includes a first opening and closing valve 24a, a second opening and closing valve 24b, a third opening and closing valve 24c, and a fourth opening and closing valve 24d. A first end of each of the first opening and closing valve 24a and the second opening and closing valve 24b are connected to the pressure tank 26 via the tank connection main flow passage 16b (the main flow passage 16). A first end of the third opening and closing valve 24c is connected to the outlet of the compressor unit 30 via the compressor outlet flow passage 28a, and is connected to a second end of the second opening and closing valve 24b. A second end of the third opening and closing valve 24c is connected to the air spring 12 (the vehicle height adjustment unit and the front wheel valve unit 18a). A first end of the fourth opening and closing valve 24d is connected to the inlet of the compressor unit 30 via the compressor inlet flow passage 28b, and is connected to a second end of the first opening and closing valve 24a. A second end of the fourth opening and closing valve 24d is connected to the air spring 12 (the vehicle height adjustment unit and the front wheel valve unit 18a).

The same type of opening and closing valve can be used in the first opening and closing valve 24a, the second opening and closing valve 24b, the third opening and closing valve 24c, and the fourth opening and closing valve 24d of the circuit valve block 24, and for example, each of the first opening and closing valve 24a, the second opening and closing valve 24b, the third opening and closing valve 24c, and the fourth opening and closing valve 24d has an ON/OFF controlled solenoid and a spring. Any of the control valves can be a normally closed electro-magnetic control valve that is closed when the solenoid of the control valve is not energized.

The vehicle height adjustment apparatus 10 of the embodiment includes a first pressure sensor 32a and a second pressure sensor 32b. In FIG. 1, for example, the first pressure sensor 32a is disposed upstream of the circuit valve block (the plurality of opening and closing valves) 24, and the second pressure sensor 32b is disposed downstream thereof. That is, the circuit valve block (valve body block) 24 includes the first pressure sensor 32a for detecting the pressure of the pressure tank 26, and the second pressure sensor 32b for detecting the pressure of the air spring 12 (the vehicle height adjustment unit and the front wheel valve unit 18a). For example, the circuit valve block 24 is made of metal or resin, and channels are formed inside the circuit valve block 24 so as to allow the above-mentioned connections of the first opening and closing valve 24a, the second opening and closing valve 24b, the third opening and closing valve 24c, and the fourth opening and closing valve 24d. The first pressure sensor 32a is connected to one of the channels, which connects the respective first ends of the first opening and closing valve 24a and the second opening and closing valve 24b and the tank connection main flow passage 16b (the main flow passage 16) (in FIG. 1, the first pressure sensor 32a is connected to a channel that extends from the first end of the first opening and closing valve 24a). The second pressure sensor 32b is connected to one of the channels, which connects the respective first ends of the third opening and closing valve 24c and the fourth opening and closing valve 24d and the main flow passage 16 (in FIG. 1, the second pressure sensor 32b is connected to a channel that extends from the first end of the third opening and closing valve 24c).

For example, when the first opening and closing valve 24a and the second opening and closing valve 24b are closed, the first pressure sensor 32a can accurately detect the static pressure of the pressure tank 26. When at least one of the first opening and closing valve 24a and the second opening and closing valve 24b is opened and the working fluid flows through the channel, the first pressure sensor 32a can detect the dynamic pressure of the pressure tank 26. Similarly, when the third opening and closing valve 24c and the fourth opening and closing valve 24d are closed, and at least one of the respective vehicle height adjustment valves 14FR and 14FL of the front wheels is opened, the second pressure sensor 32b can detect the static pressure of the air spring 12. When the third opening and closing valve 24c and the fourth opening and closing valve 24d are closed, the vehicle height adjustment valves 14RR and 14RL are closed, and one of the vehicle height adjustment valves 14FR and 14FL is opened, the second pressure sensor 32b can detect the static pressure of any one of the respective air springs 12FR and 12FL of the front wheels. When both of the vehicle height adjustment valves 14FR and 14FL are opened, the second pressure sensor 32b can detect an average static pressure of the air springs 12FR and 12FL. When the third opening and closing valve 24c and the fourth opening and closing valve 24d are closed, the vehicle height adjustment valves 14RR and 14RL are closed, and one of the vehicle height adjustment valves 14RR and 14RL is opened, the second pressure sensor 32b can detect the static pressure of any one of the respective air springs 12RR and 12RL of the rear wheels. When both of the vehicle height adjustment valves 14RR and 14RL are opened, the second pressure sensor 32b can detect an average static pressure of the air springs 12RR and 12RL. When the third opening and closing valve 24c and the fourth opening and closing valve 24d are closed, the vehicle height adjustment valves 14FR, 14FL, 14RR, and 14RL are opened, the second pressure sensor 32b can detect the static pressure of the entirety of the air springs 12FR, 12FL, 12RR, and 12RL that correspond to the entirety of the wheels, respectively. When the third opening and closing valve 24c or the fourth opening and closing valve 24d is opened, the second pressure sensor 32b can detect the dynamic pressure of the air spring 12 (the vehicle height adjustment unit, the front wheel valve unit 18a, and the rear wheel valve unit 18b).

As such, the first pressure sensor 32a can detect the pressure (static pressure or dynamic pressure) of an upstream side (for example, the pressure tank 26) of the circuit valve block 24, and the second pressure sensor 32b can detect the pressure (static pressure or dynamic pressure) of a downstream side (for example, the air spring 12) of the circuit valve block 24. Since the working fluid flows from the pressure tank 26 toward the air spring 12 due to a pressure difference (differential pressure) between the pressure tank 26 and the air spring 12, the vehicle height can be adjusted, which will be described later. In other words, since a small pressure difference does not allow the flow of a sufficient amount of the working fluid for the adjustment of the vehicle height, it is necessary to drive the compressor unit 30. The vehicle height adjustment apparatus 10 can acquire (calculate) a pressure difference (differential pressure) based on the detected result of the first pressure sensor 32a and the second pressure sensor 32b, and control the driving of the compressor unit 30 based on the result. For example, when a vehicle height increasing control operation is performed, and the pressure difference between the pressure tank 26 and the air spring 12 is greater than or equal to a predetermined value (threshold value), the working fluid can flow from the pressure tank 26 toward the air spring 12 due to the pressure difference. At this time, a compressor 36 can be brought into a non-drive state. In contrast, when the pressure difference between the pressure tank 26 and the air spring 12 is less than the predetermined value (threshold value), and a vehicle height increasing control operation is continuously performed, the compressor 36 can be driven at that timing (timing at which the compressor 36 is required to pressure-feed the working fluid).

For example, the pressure tank 26 is made of metal or resin, and has a capacity and pressure resistance properties that allow the pressure tank 26 to sufficiently resist against pressure occurring in a flow passage system when a vehicle height adjustment control of the air spring 12 is performed or not. The pressure tank 26 has a relief valve 26b that reduces the internal pressure of a tank main body 26a when the internal pressure is greater than or equal to a set pressure (pressure that is set in advance via testing and the like) due to an unknown reason.

The compressor unit 30 has the following main configurations: the compressor 36 driven by a motor 34; a dryer 38; and a throttle mechanism 40 including an orifice 40a and a check valve 40b. FIG. 1 illustrates an example in which the compressor unit 30 further includes a relief valve 42; check valves 44, 46, and 48; and filters 50 and 52.

When the pressure difference between the pressure tank 26 and the air spring 12 is less than or equal to a predetermined value (value that is set via pre-experiments and the like) during the execution of a vehicle height increasing control operation, or the working fluid is drawn (returns back) into the pressure tank 26 from the air spring 12 during the execution of a vehicle height decreasing control operation, the motor 34 operates the compressor 36, and the compressor unit 30 pressure-feeds the working fluid. The vehicle height adjustment apparatus 10 of the embodiment is a closed type apparatus that adjusts the vehicle height by moving the working fluid in the flow passages (air sealed in the flow passages from the very beginning when the vehicle height adjustment apparatus 10 is built) between the pressure tank 26 and the air spring 12. Accordingly, basically, external air may not intrude into the vehicle height adjustment apparatus 10, and the vehicle height adjustment apparatus 10 is not affected by environmental changes such as humidity fluctuations. Accordingly, basically, it is possible to remove the dryer 38 or the throttle mechanism 40 from the closed type apparatus. The working fluid (air) in the apparatus may leak to the outside due to an unknown reason. At this time, the apparatus supplements the working fluid therein by suctioning the atmosphere (external air) from the outside via the filter 52 and the check valve 48. At this time, the atmosphere (external air) may contain moisture (humid air) that adversely affects configuration components of the vehicle height adjustment apparatus 10. For this reason, in the vehicle height adjustment apparatus 10 illustrated in FIG. 1, the dryer 38 and the throttle mechanism 40 are provided downstream of the compressor 36. The dryer 38 removes a predetermined amount of humid air from the suctioned atmosphere, and the throttle mechanism 40 adjusts the passing through speed of the atmosphere that passes through the dryer 38. The compressor unit 30 has the relief valve 42 so as to reduce the internal pressure of the vehicle height adjustment apparatus 10 when the internal pressure exceeds limit pressure due to an unknown reason. For example, the relief valve 42 has an ON/OFF controlled solenoid and a spring, and a normally closed electro-magnetic control valve that is closed when the solenoid is not energized can be used as the relief valve 42. The relief valve 42 of the embodiment has a check valve 54 that allows the flow of the working fluid to the outside without maintaining a closed state of the non-energized solenoid in any cases when the internal pressure of the vehicle height adjustment apparatus 10 exceeds the limit pressure (pressure that is set via pre-experiments and the like). For example, when the internal pressure of the vehicle height adjustment apparatus 10 exceeds the limit pressure due to the occurrence of an unknown malfunction, the internal pressure opens the relief valve 42 against a biasing force of the check valve 54, and thus the internal pressure is automatically reduced below the limit pressure. The relief valve 42 can be opened based on a control signal from a control unit that will be described later, and thus can reduce the internal pressure of the vehicle height adjustment apparatus 10 regardless of the limit pressure. The compressor 36 also functions as a supply source that supplies the working fluid to the air spring 12.

In the vehicle height adjustment apparatus 10 with this configuration, a control unit (ECU) 56 of the vehicle height adjustment apparatus 10 controls the vehicle height adjustment unit (the air springs, the vehicle height adjustment valves, and the like which will be described later) to adjust the vehicle height. For example, the ECU 56 can acquire the demand for vehicle height adjustment via a controller area network (CAN); the detected result of a vehicle height sensor 58 that detects an extension and contraction (vehicle height) state of each of the air springs 12; and the detected result of the first pressure sensor 32a and the second pressure sensor 32b. The ECU 56 controls the opening and closing of the vehicle height adjustment valves 14FR, 14FL, 14RR, 14RL, the first opening and closing valve 24a, the second opening and closing valve 24b, the third opening and closing valve 24c, the fourth opening and closing valve 24d, and the relief valve 42, or the driving of the motor 34, based on the acquired information. FIG. 1 illustrates an example in which the single ECU 56 controls each control target in an integrated manner. However, a control unit may be provided to individually control each control target, or some control units may be provided to control several control targets as a group, and an upper control unit may be provided to control the several control units in an integrated manner.

As described above, in the vehicle height adjustment apparatus 10 of the embodiment, since the first pressure sensor 32a is disposed upstream of the circuit valve block 24, and the second pressure sensor 32b is disposed downstream of the circuit valve block 24, it is possible to detect the pressure of the pressure tank 26 and the air spring 12. In particular, it is possible to detect the pressure in real time when a vehicle height increasing control operation is performed. As a result, the ECU 56 can accurately determine whether a pressure difference is sufficient enough to allow the flow of the working fluid, and when the pressure difference is insufficient, the ECU 56 can drive the compressor 36 for a necessary time period at an appropriate time. As a result, it is possible to optimize the control of the drive of the compressor 36, perform control with lower power consumption, and reduce noise or vibration caused by the driving of the compressor 36. The first pressure sensor 32a and the second pressure sensor 32b can detect the pressure of the pressure tank 26 and the air spring 12 in real time, respectively, and the detected pressure can be reflected in the controlling of the vehicle height. For example, it is possible to smoothly adjust the vehicle height at all times by driving the compressor 36 at an appropriate time as described above. It is possible to smoothly adjust the vehicle height in response to road surface conditions. As a result, it is possible to improve riding comfort, and maneuverability.

Since it is possible to operate the compressor 36 at an appropriate timing, for example, even when the wheels get on a curb stone, and the vehicle body inclines in a lateral direction, it is possible to maintain the vehicle body in a substantially horizontal state by appropriately adjusting the vehicle height, and reduce the discomfort or anxiety of an occupant and the like. It is possible to maintain a force exerted (force exerted on a hinge portion) for the opening and closing of a door at the same level as when the vehicle body is in a horizontal state, and easily open and close the door. It is possible to obtain the same level of boarding and deboarding characteristics as when the vehicle body is in a horizontal state.

The vehicle height increasing and decreasing control operations of the vehicle height adjustment apparatus 10 with this configuration will be described with reference to FIGS. 2 to 4.

First, in the following description of the operation of the vehicle height adjustment apparatus 10 with reference to FIG. 2, when a vehicle height increasing control operation is performed, the pressure of the pressure tank 26 is sufficiently higher than that of the air spring 12, and the working fluid (air) can flow from the pressure tank 26 toward the air spring 12 due to a pressure difference between the pressure tank 26 and the air spring 12. The ECU 56 acquires the pressure of the pressure tank 26 based on the detected result of the first pressure sensor 32a, and the pressure of the air spring 12 based on the detected result of the second pressure sensor 32b, calculates a pressure difference, and thus determines whether the pressure difference is sufficient enough to allow the flow of the working fluid (air).

When a vehicle height increasing adjustment control operation is performed, a vehicle height adjustment speed is preferably changed based on situations. For example, an operator may want to increase the vehicle height so as to reduce a burden on the occupant in boarding or deboarding the vehicle. At this time, it is desirable that the increasing of the vehicle height be quickly completed in order for the occupant to be able to board and deboard the vehicle. The operator may preferably want to increase the vehicle height in response to travelling states (speed, road surface conditions, and the like) when the vehicle is travelling. At this time, the operator desirably increases the vehicle height in an increasing speed range in which the occupant is not discomfortable while a stable travelling is maintained.

When the vehicle height adjustment apparatus 10 performs a vehicle height increasing control operation, the ECU 56 controls the opening and closing of the first opening and closing valve 24a, the second opening and closing valve 24b, the third opening and closing valve 24c, and the fourth opening and closing valve 24d of the circuit valve block 24, and the opening of the vehicle height adjustment valves 14FR, 14FL, 14RR, and 14RL.

The vehicle height adjustment apparatus 10 of the embodiment can switch the flow mode (flow direction, flow rate, or the like) of the working fluid by changing the combination of the respective opening and closing states of the first opening and closing valve 24a, the second opening and closing valve 24b, the third opening and closing valve 24c, and the fourth opening and closing valve 24d of the circuit valve block 24. For example, when the working fluid flows from the pressure tank 26 toward the vehicle height adjustment unit (the air spring 12) due to a pressure difference therebetween, the ECU 56 can selectively use at least one of first and second flow passage systems. The first flow passage system is formed when the first opening and closing valve 24a and the fourth opening and closing valve 24d are opened, and the second flow passage system is formed when the second opening and closing valve 24b and the third opening and closing valve 24c are opened. For example, when the ease of flow of a first flow mode (flow passage opening diameter due to the ease of flow associated with flow resistance) of the first flow passage system is actually the same as that of a second flow mode (flow passage opening diameter due to the ease of flow associated with flow resistance) of the second flow passage system, the ECU 56 selects any one of the first and second flow passage systems. At this time, the working fluid flowing out of the pressure tank 26 via the tank connection main flow passage 16b can be supplied to the air spring 12 in a first speed mode (for example, low-speed increasing mode) while passing through the first flow passage system or the second flow passage system, the air spring 12 extends due to the opening of the vehicle height adjustment valve 14, and it is possible to increase the vehicle height at a low speed.

When the ECU 56 selects the first and second flow passage systems, the flow of the working fluid is actually two times easier compared to when the ECU 56 selects any one of the first and second flow passage systems, and the working fluid can be supplied to the air spring 12 in a second speed mode (for example, high-speed increasing mode) faster than in the first speed mode. As a result, the air spring 12 extends due to the opening of the vehicle height adjustment valve 14, and it is possible to increase the vehicle height at a higher speed compared to the first speed mode.

The ECU 56 can switch the ease of flow of the working fluid (flow rate of the working fluid) per a unit time period by selecting the first and/or second flow passage systems, and easily change the vehicle height increasing speed. In another embodiment, the first flow mode of the first flow passage system defined by the opening of the first opening and closing valve 24a and the fourth opening and closing valve 24d may be set differently from the second flow mode of the second flow passage system defined by the opening of the second opening and closing valve 24b and the third opening and closing valve 24c. For example, the opening diameter of the opening and closing valves of the first flow passage system may be different from that of the second flow passage system. As a result, when the ECU 56 opens the first opening and closing valve 24a and the fourth opening and closing valve 24d, and selects the first flow passage system, a speed mode becomes the low-speed increasing mode. When the ECU 56 opens the second opening and closing valve 24b and the third opening and closing valve 24c, and selects the second flow passage system, a speed mode becomes a medium-speed increasing mode. When the ECU 56 selects the first and second flow passage systems, a speed mode becomes the high-speed increasing mode.

The first and/or second flow passage systems may be selected multiple times during one vehicle height increasing process. For example, in an initial period of a vehicle height increasing operation, the increasing speed may be set to the first speed mode in which any one of the first flow passage system and the second flow passage system is selected. In an intermediate period, the increasing speed may be set to the second speed mode in which both of the first and second flow passage systems are selected, and which is faster than the first mode. In a final period, the increasing speed may be set to the first speed mode again. It is possible to reduce a shock at the start of the increasing of the vehicle height by starting the increasing of the vehicle height slowly in the first speed mode. It is possible to reduce a time period it takes to complete the vehicle height increasing control operation by changing a speed mode to the second speed mode in the intermediate period, in which the vehicle height is increased at a high speed. It is possible to reduce a shock at the stop of increasing of the vehicle height by switching a speed mode to the first speed mode again and increasing the vehicle height slowly in the final period.

Figure 2:
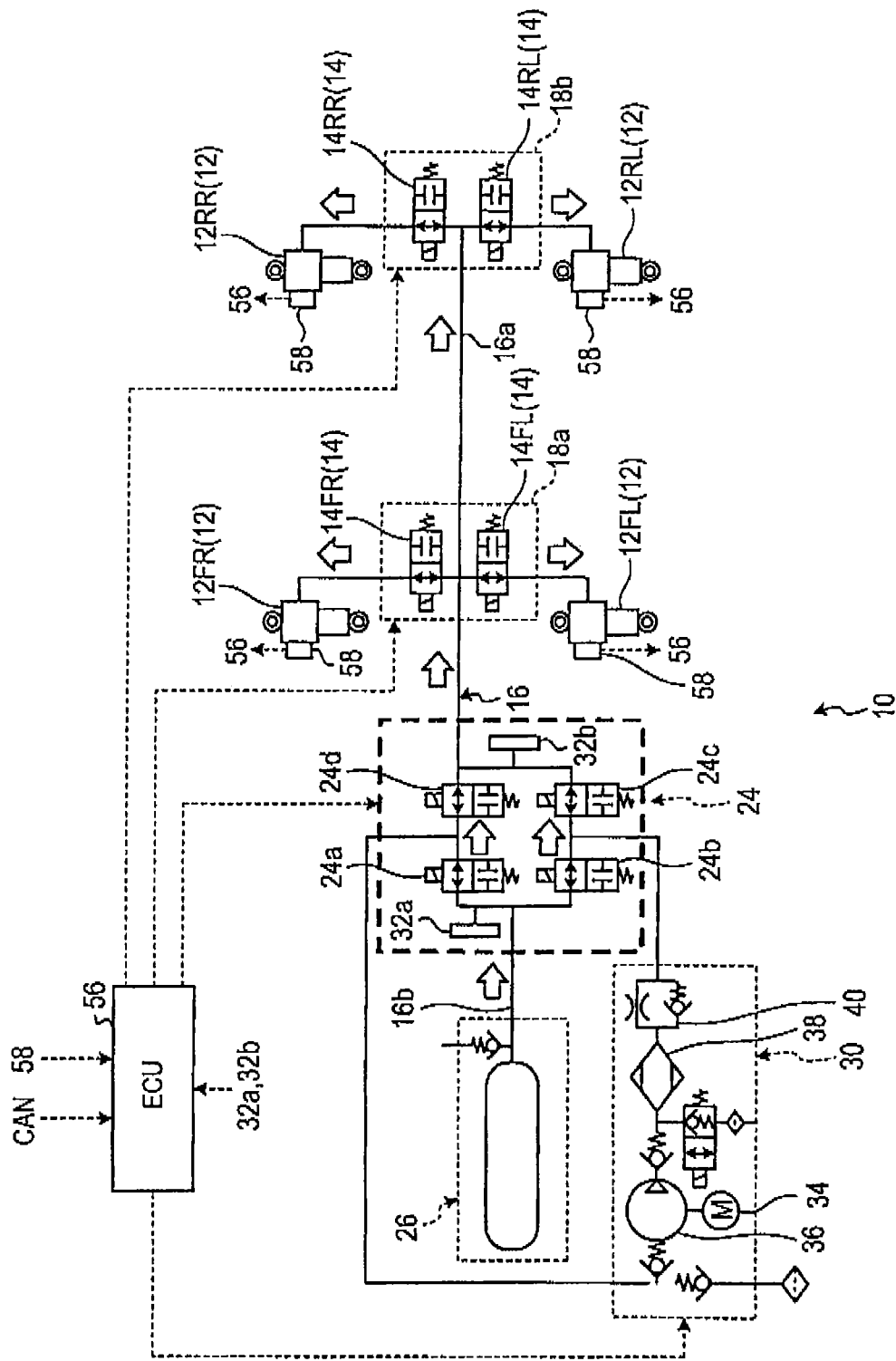
FIG. 2 is a diagram illustrating the state of opening and closing valves and the flow of the working fluid when the vehicle height adjustment apparatus of the embodiment performs a vehicle height increasing control operation without a compressor being driven.

As illustrated in FIG. 2 and the like, in the vehicle height adjustment apparatus 10 of the embodiment, the second end of the second opening and closing valve 24b and the first end of the third opening and closing valve 24c are connected to the throttle mechanism 40, and the second end of the second opening and closing valve 24b is also connected to the first end of the third opening and closing valve 24c. That is, when the working fluid flows toward the air spring 12 due to a pressure difference between the pressure tank 26 and the air spring 12, regardless of the throttle mechanism 40, that is, the compressor unit 30, the working fluid can pass through any one or both of the first flow passage system formed in the first opening and closing valve 24a and the fourth opening and closing valve 24d and the second flow passage system formed in the second opening and closing valve 24b and the third opening and closing valve 24c. In other words, when the working fluid flows due to the pressure difference, the working fluid does not pass through the compressor unit 30. Accordingly, it is possible to simplify the flow passage of the working fluid that flows due to the pressure difference, and reduce the occurrence of pressure loss during the flow of the working fluid.

In the vehicle height adjustment apparatus 10, basically, the working fluid flows toward the air spring 12 due to a pressure difference between the pressure tank 26 and the air spring 12. However, since the working fluid flows from the pressure tank 26 toward the air spring 12, the pressure difference between the pressure tank 26 and the air spring 12 may dissipate so as not to allow a sufficient flow of the working fluid. In addition, there may not be present sufficient pressure difference (differential pressure) between the pressure tank 26 and the air spring 12 when a vehicle height increasing control operation is started. At this time, the ECU 56 drives the motor 34 of the compressor unit 30, and the compressor 36 forcibly draws the working fluid from the pressure tank 26, and pressure-feeds the working fluid toward the air spring 12.

Figure 3:
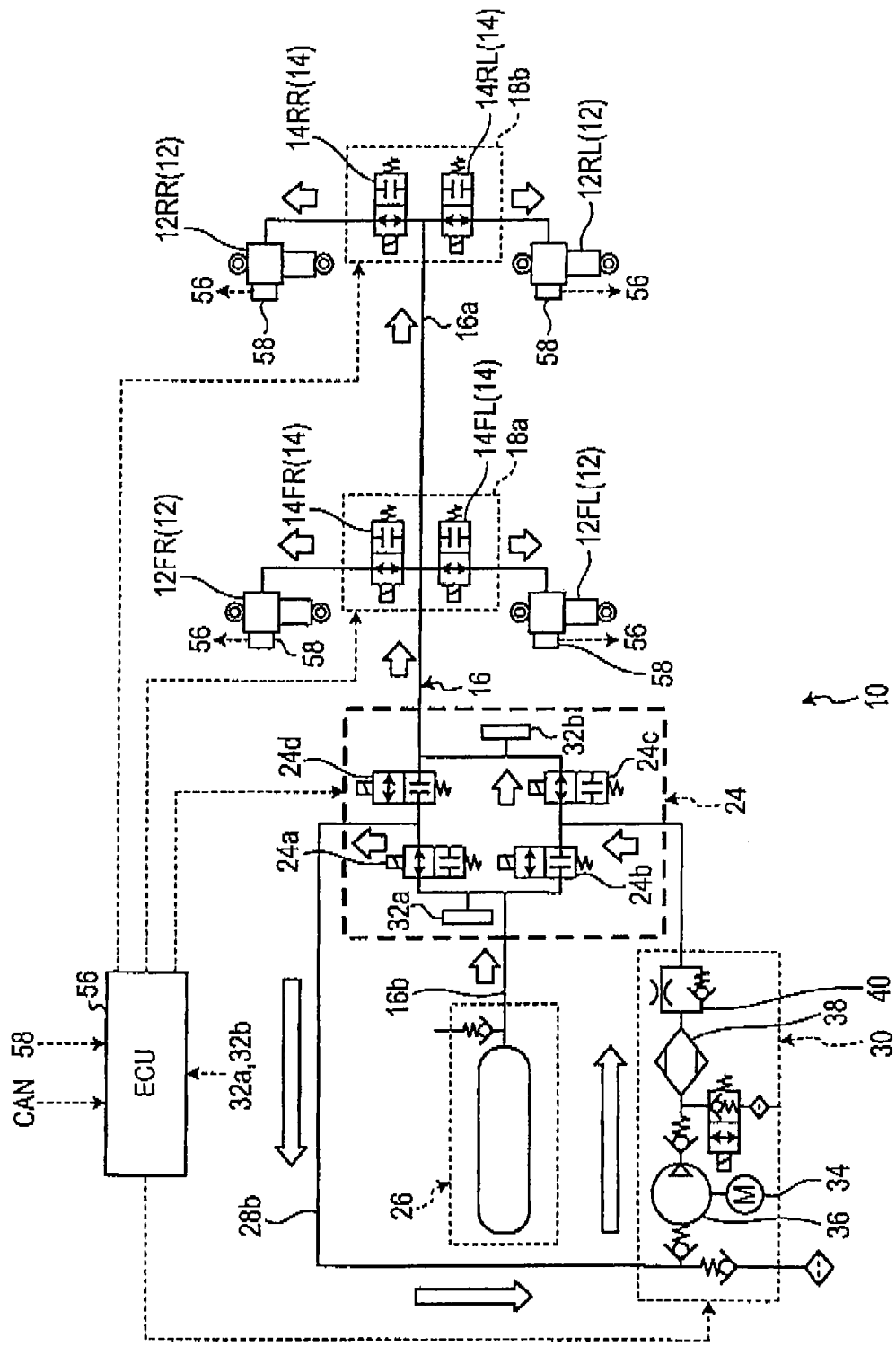
FIG. 3 is a diagram illustrating the state of opening and closing valves and the flow of the working fluid when the vehicle height adjustment apparatus of the embodiment performs a vehicle height increasing control operation with the compressor being driven.

In the operation of the vehicle height adjustment apparatus 10 illustrated in FIG. 3, when a vehicle height decreasing control operation is performed, the compressor 36 pressure-feeds the working fluid toward the air spring 12. For example, when it is determined that a pressure difference between the pressure tank 26 and the air spring 12 is less than or equal to a predetermined value, based on the detected results of the first pressure sensor 32a and the second pressure sensor 32b, the ECU 56 switches the respective opening and closing states of the first opening and closing valve 24a, the second opening and closing valve 24b, the third opening and closing valve 24c, and the fourth opening and closing valve 24d, and controls the compressor 36 to start the pressure feed of the working fluid. It is possible to determine the predetermined value for the pressure difference to trigger the switching of the opening and closing states, based on via testing carried out in advance and the like. For example, it is possible to determine a differential pressure value in such a manner that the vehicle height increasing speed becomes less than the predetermined value. At this time, it is desirable that the compressor 36 start the pressure feed of the working fluid before the increasing of the vehicle height is stopped.

In another embodiment, the compressor 36 may start the pressure feed of the working fluid based on the detected result of the vehicle height sensors 58. That is, when a pressure difference between the pressure tank 26 and the air spring 12 decreases, the vehicle height increasing speed decreases as well. Accordingly, the ECU 56 may calculate the vehicle height increasing speed by time-differentiating a vehicle height value from each of the vehicle height sensors 58, and when the vehicle height increasing speed is less than a predetermined value (low increasing speed limit determined in advance via testing and the like), the ECU 56 may control the compressor 36 to start the pressure feed of the working fluid. The ECU 56 may determine a start of driving of the compressor 36 based on the detected results of the first pressure sensor 32a and the second pressure sensor 32b and the detected result of the vehicle height sensor 58.

As illustrated in FIG. 3, when a pressure difference is less than or equal to the predetermined value based on the detected results of the first pressure sensor 32a and the second pressure sensor 32b, or when the vehicle height increasing speed is less than or equal to the predetermined value based on the detected vehicle height value of each of the vehicle height sensors 58, the ECU 56 brings the first opening and closing valve 24a into an opening state, and the fourth opening and closing valve 24d into a closing state. At this time, the pressure tank 26 and the compressor 36 are brought into communication with each other. The second opening and closing valve 24b is closed, and the third opening and closing valve 24c is opened. At this time, the compressor 36 and the air spring 12 are brought into communication with each other. As a result, the working fluid in the pressure tank 26 is drawn into the compressor 36 via the tank connection main flow passage 16b, the first opening and closing valve 24a, and the compressor inlet flow passage 28b by the driving of the compressor 36. The drawn working fluid is compressed, and pressure-fed toward the air spring 12 via the compressor outlet flow passage 28a and the third opening and closing valve 24c. As a result, the air spring 12 can be controlled to increase the vehicle height even when there is no sufficient pressure difference between the pressure tank 26 and the air spring 12. At this time, the vehicle height increasing speed is determined by the output of the compressor 36, that is, the output of the motor 34. For this reason, the ECU 56 controls the output of the motor 34 in response to a demanded vehicle height increasing speed, for example, a high-speed vehicle height increasing demand or a low-speed vehicle height increasing demand. Even when the vehicle height increasing speed is changed multiple times in one vehicle height increasing process as described above, the ECU 56 preferably controls the output of the motor 34.

When there is present a pressure difference between the pressure tank 26 and the air spring 12, but the weight of the vehicle is increased before or while a vehicle height increasing control operation is performed, for example, when the number of occupants increases, or when the amount of cargo increases, a load which the air spring 12 has to support increases, thereby contracting the air spring 12. As a result, the pressure of the air spring 12 increases, and a pressure difference (differential pressure) between the pressure tank 26 and the air spring 12 may dissipate. Even in this case, the vehicle height increasing speed decreases. It is possible to detect these conditions based on the detected values of the first pressure sensor 32a and the second pressure sensor 32b or the vehicle height sensor 58. Accordingly, the ECU 56 can control the compressor 36 to start the pressure feed of the working fluid at an appropriate timing.

Subsequently, the operation of the vehicle height adjustment apparatus 10 during the execution of a vehicle height decreasing control operation will be described with reference to FIG. 4. For example, when acquiring a vehicle height decreasing demand via the CAN, the ECU 56 switches the opening and closing states of the first opening and closing valve 24a, the second opening and closing valve 24b, the third opening and closing valve 24c, and the fourth opening and closing valve 24d. As a result, it is possible to draw the working fluid from the air spring 12, and return the working fluid back to the pressure tank 26 (pressure-feed the working fluid toward the pressure tank 26), using the compressor 36, and it is possible to contract the air spring 12, and decrease the vehicle height.

Figure 4:
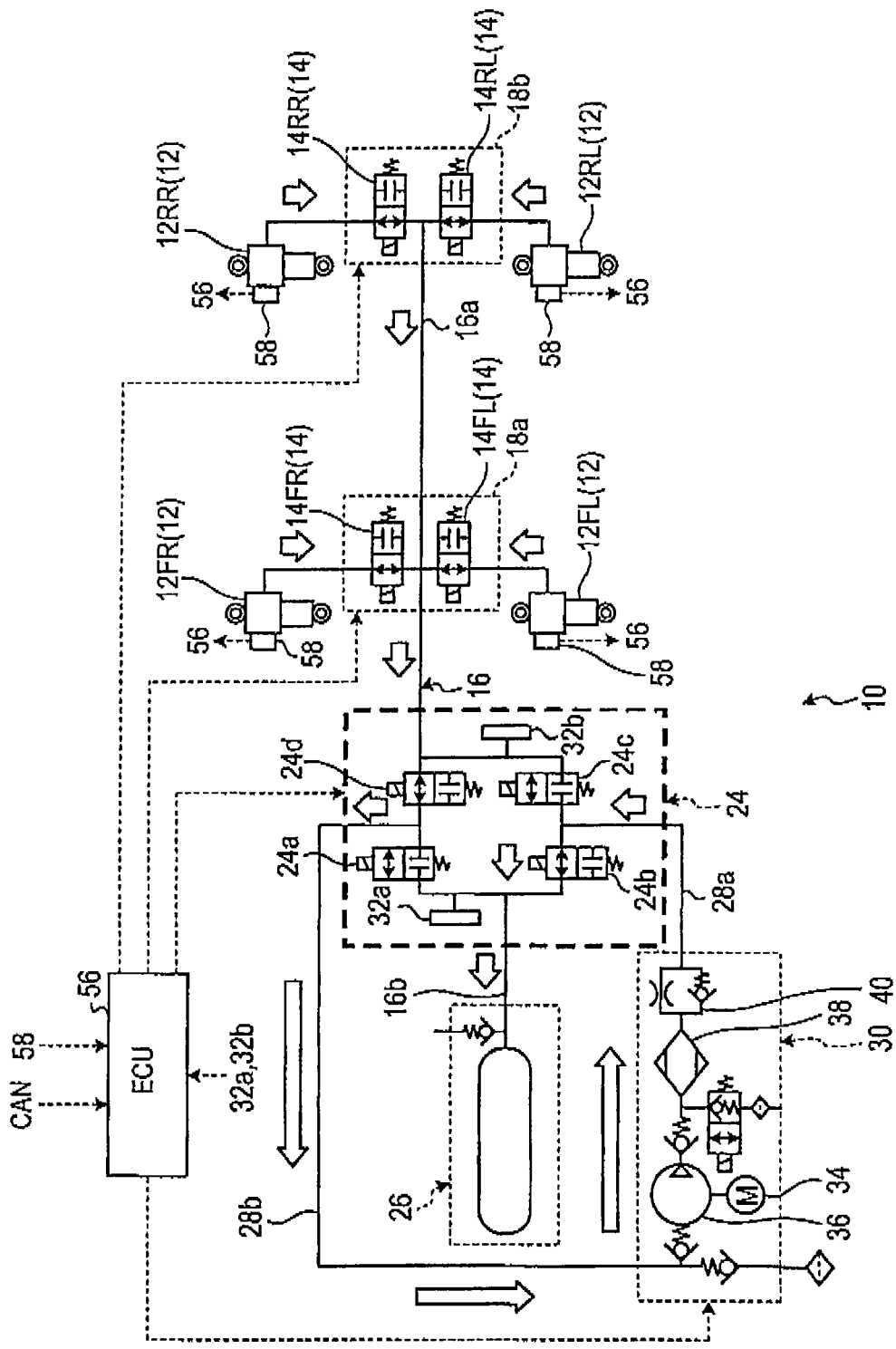
FIG. 4 is a diagram illustrating the state of opening and closing valves and the flow of the working fluid when the vehicle height adjustment apparatus of the embodiment performs a vehicle height decreasing control operation with the compressor being driven.

As illustrated in FIG. 4, when a vehicle height decreasing control operation is performed, the ECU 56 brings the first opening and closing valve 24a into a closing state, and the fourth opening and closing valve 24d into an opening state. The second opening and closing valve 24b is opened, and the third opening and closing valve 24c is maintained closed. The vehicle height adjustment valves 14FR, 14FL, 14RR, and 14RL are opened. As a result, the air spring 12 and the compressor 36 are brought into communication with each other via the fourth opening and closing valve 24*d* and the compressor inlet flow passage 28*b*. The outlet of the compressor 36 communicates with the pressure tank 26 via the compressor outlet flow passage 28*a*, the second opening and closing valve 24*b*, and the tank connection main flow passage 16*b*. The working fluid of the air spring 12 is drawn and pressure-fed to the pressure tank 26 by the compressor 36.

When a vehicle height decreasing control operation is performed, the vehicle height decreasing speed depends on a speed at which the working fluid is drawn by the compressor 36. That is, since the ECU 56 can arbitrarily adjust the output of the motor 34, the ECU 56 can arbitrarily select the vehicle height decreasing speed. Accordingly, the ECU 56 increases the output of the motor 34 when it is necessary to increase the vehicle height decreasing speed, and the ECU 56 decreases the output of the motor 34 when it is necessary to decrease the vehicle height decreasing speed. For example, when the occupants including a driver parks (stops) the vehicle, and move away from the vehicle, the ECU 56 may notify the occupants of the fact that the vehicle is in a resting state. At this time, it is possible to demonstrate that the vehicle comes into a resting state by itself by quickly decreasing the vehicle height lower than a normal vehicle height in a period in which the occupants including the driver stay in the vicinity of the vehicle, for example, for a few seconds after the driver turns off a drive source of the vehicle, deboards the vehicle, and lock the doors. It is possible to decrease the vehicle height in a speed range in which the occupant does not have the discomfort while a stable travelling is maintained, when stable travelling can be obtained by decreasing the vehicle height during the travelling.

The ECU 56 can adjust the amount of decreasing of the vehicle height by controlling a drive period of the compressor 36. For example, when the occupants including a driver park (stop) the vehicle, and move away from the vehicle, it is possible to demonstrate that the silhouette of the vehicle while being parked or stopped looks beautiful by decreasing the vehicle height. It is possible to prevent the theft of the wheels or the theft of the vehicle by decreasing the vehicle height. When the vehicle height decreasing control operation is performed, a sensor or the like preferably detects obstacles under the bottom surface of the vehicle and at the surroundings thereof in such a manner that the vehicle does not become damaged.

The ground clearance of the seat of a vehicle varies depending on the type of a vehicle, and the occupant takes a boarding and deboarding posture in response to the ground clearance of the seat when boarding and deboarding the vehicle. For example, in many cases, the occupant takes a stooped posture when boarding and deboarding a passenger vehicle such as a so-called sedan vehicle. In a sports vehicle, the ground clearance of a seat is less than that of a typical passenger vehicle, and thus it is necessary for the occupant to further lower a stooped posture. In contrast, in a sport utility vehicle (SUV), the ground clearance of a seat is greater than that of a sedan vehicle and the like. For this reason, it is necessary for the occupant to take a tiptoe posture for boarding, and a jump-off posture for deboarding. The vehicle height adjustment apparatus 10 of the embodiment includes a boarding and deboarding vehicle height adjustment function for reducing a burden on the occupant in boarding and deboarding the vehicle.

Specifically, the ECU 56 can adjust the air spring 12 to at least one of a first vehicle height (boarding and deboarding vehicle height, first vehicle height mode, or boarding and deboarding mode) suitable for at least one of boarding and deboarding, and a second vehicle height (travelling vehicle height, normal vehicle height, travelling mode, or normal mode) suitable for travelling. When the ECU 56 acquires preparation information (boarding preparation information) indicative of a state (boarding preparation state) in which the occupant prepares to board the vehicle, or preparation information (deboarding preparation information) indicative of a state (deboarding preparation state) in which the occupant prepares to deboard the vehicle, the ECU 56 adjusts the air spring 12 from the second vehicle height to the first vehicle height. That is, the ECU 56 adjusts the air spring 12 from a vehicle height suitable for travelling, in other words, a vehicle height (travelling priority vehicle height or appearance priority vehicle height) not much suitable for boarding and deboarding to a vehicle height (vehicle height at which the occupant can reduce movements (burdens) when boarding and deboarding the vehicle) suitable for boarding and deboarding. When the ECU 56 acquires completion information indicative of the completion of boarding or the completion of deboarding, the ECU 56 adjusts the air spring 12 from the first vehicle height to the second vehicle height so as to be able to achieve stable and smooth travelling or attractive parking. That is, the vehicle body returns back to a stable posture. Since the second vehicle height is a stable posture, the second vehicle height is stable even as a parking and stopping posture.

Here, door open information, door unlocking information, or the like can be used as the preparation information (boarding preparation information) indicative of the boarding preparation state. Any one of the above-mentioned information is information based on an operation necessary for boarding. For example, a lighting signal of a courtesy lamp can be used as the door open information, and the courtesy lamp is turned on when a door is opened. The door open information may be a detected operation state of a door knob. The door unlocking information may be an activation signal of a so-called keyless entry or smart entry. The door unlocking information may be a detected operation state of a door cylinder or a member related to the door cylinder. Any one of pieces of the boarding preparation information may be used, and a plurality of the pieces of boarding preparation information may be combined for use.

The following information can be used as the preparation information (deboarding preparation information) indicative of the deboarding preparation state: the door open information, the door unlocking information, seat belt release information, shift information, parking brake information, vehicle power source OFF information, or the like. Any one of the above-mentioned information is information based on an operation necessary for deboarding. For example, the door open information is the same as that in the boarding preparation information, and an operation signal of a door unlocking button (lever) can be used as the door unlocking information. A seat belt ON and OFF signal can be used as the seat belt release information, and a shift signal indicative of a shift position being in a parking position can be used as the shift information. A signal indicative of a parking brake being in operation can be used as the parking brake information. The vehicle power source OFF information may be ignition switch OFF information, propulsion motor power source switch OFF information, or the like. Any one of the pieces of the deboarding preparation information may be used, and a plurality of the pieces of deboarding preparation information may be combined for use.

For example, when the ECU 56 acquires the boarding preparation information, the working fluid is allowed to move between the pressure tank 26 and the air spring 12, and therefore the air spring 12 is adjusted to the first vehicle height via the extension and contraction thereof. For example, when a vehicle equipped with the vehicle height adjustment apparatus 10 is a sedan vehicle with not much large vehicle height, the air spring 12 is controlled to extend. At this time, for example, the air spring 12 is allowed to extend to its maximum length. Typically, since the air spring 12 is controlled not to extend to its maximum length so as to absorb the bounding of the vehicle while travelling, but it is not necessary to consider the bounding of the vehicle when boarding and deboarding the vehicle, boarding and deboarding characteristics take priority over other factors, and the air spring 12 is allowed to extend to its maximum length. As such, when the occupant boards and deboards a vehicle with a low original vehicle height, an increase in vehicle height allows the occupant to take a less stooped posture and to smoothly board and deboard the vehicle, compared to when the adjustment (increasing adjustment) of the vehicle height is not performed. That is, a burden on the occupant in boarding and deboarding the vehicle is reduced. At this time, the first vehicle height is a vehicle height greater than the second vehicle height (normal vehicle height) suitable for travelling, the air spring 12 is not necessarily required to extend to its maximum length (maximum vehicle height), and the first vehicle height may be a vehicle height between the second vehicle height and the maximum vehicle height.

For example, when a vehicle equipped with the vehicle height adjustment apparatus 10 is an SUV vehicle with a large vehicle height, the first vehicle height suitable for boarding is set to be lower than the second vehicle height suitable for travelling, and thus when the air spring 12 is adjusted to the first vehicle height, the air spring 12 is required to contract. At this time, since it is not necessary to consider the absorption of the bounding of the vehicle while travelling, the air spring 12 may be allowed to contract to its minimum length as necessary. As such, when the occupant boards and deboards a vehicle with a high original vehicle height, a decrease in vehicle height can allow the occupant to stretch less on tiptoes for boarding or jump off a shorter distance for deboarding, or can prevent the occupant from taking a tiptoe posture for boarding or a jump-off posture for deboarding, and the occupant is allowed to smoothly board and deboard the vehicle, compared to when the adjustment (decreasing adjustment) of the vehicle height is not performed. That is, a burden on the occupant in boarding and deboarding the vehicle is reduced. At this time, the first vehicle height is a vehicle height lower than the second vehicle height (normal vehicle height) suitable for travelling, the air spring 12 is not necessarily required to contract to its minimum length (minimum vehicle height), and the first vehicle height may be a vehicle height between the second vehicle height and the maximum vehicle height.

The first vehicle height may be a fixed value that is determined at a design stage in response to the type of a vehicle, and may be variable in response to the preference of the occupant. For example, it may be possible to continuously or intermittently select a control value for the first vehicle height using a volume switch, a selector switch, or the like.

When the air spring 12 is adjusted from the second vehicle height to the first vehicle height, the entirety of the air springs 12 may be simultaneously controlled, or may be individually controlled. For example, it is possible to raise the vehicle body horizontally by simultaneously adjusting the entirety of the air springs 12 to the same extension state. That is, even when the occupant boards the vehicle via any door, it is possible to improve boarding characteristics.

When the ECU 56 acquires the boarding preparation information, the ECU 56 may adjust the vehicle height for the air spring 12 that corresponds to a door associated with the boarding preparation information. For example, when a door latch is unlocked using a smart entry, a driver may be highly likely to board the vehicle. At this time, the air spring 12 associated with a driver seat is adjusted to the first vehicle height. In a right-hand drive vehicle, the adjustment of the air springs 12FR and 12RR improves boarding characteristics for the right doors (driver seat door and rear door therebehind) of the vehicle. When only the air spring 12FR is adjusted, the vehicle height on only a right front side of the vehicle becomes the first vehicle height, and boarding characteristics for the driver seat door improve. At this time, it is possible to supply the working fluid to only the necessary air spring 12, achieve control refinement and control optimization, and reduce the temperature dependency of the pressure of the pressure tank 26 and a drive period of the compressor 36.

In addition, when the door latch is unlocked using the smart entry, it may be possible to select the air spring 12 that is adjusted to the first vehicle height. For example, when only the driver boards the vehicle, the vehicle height for only the air spring 12FR is adjusted. When there is present a fellow passenger, the air spring 12, the vehicle height for which is adjusted, may be selected in response to a boarding position of the fellow passenger. Typically, the door latch is unlocked and locked collectively for the entirety of the doors, but the air spring 12 may be selected in connection with an unlocking position. At this time, since boarding characteristics improve, and only necessary doors are unlocked, it is possible to improve security.

Even when the ECU 56 acquires the deboarding preparation information, similarly to when the ECU 56 acquires the boarding preparation information, the air spring 12 is adjusted to the first vehicle height. Even at this time, the vehicle height may be adjusted using the entirety of the air springs 12, or the vehicle height may be adjusted using only the air spring 12 that corresponds to a door at a passenger's deboarding position. For example, the ECU 56 acquires the deboarding preparation information associated with an operation of a knob inside the door or an unlocking operation of a door locking knob, and the vehicle height is adjusted for the air spring 12 that corresponds to the operated door.

When a seating surface of a seat is inclined, it may be possible for the occupant to smoothly board and deboard the vehicle when boarding and deboarding the vehicle, and obtain comfort. In the vehicle height adjustment apparatus 10 of the embodiment, when the ECU 56 adjusts the air spring 12 to the first vehicle height, the ECU 56 may incline the vehicle body in a lateral direction of the vehicle. For example, when a seat for boarding and deboarding used by the occupant is inclined downward toward the outside of the door, it is easy for the occupant to sit on the seat, and stand up from the seat. As a result, it is possible to smoothly board and deboard the vehicle. At this time, the ECU 56 controls the air spring 12 associated with boarding and deboarding to extend longer than the air spring 12 not associated with boarding and deboarding, and adjusts the air springs to a first vehicle height in an inclined state (inclined vehicle height). At this time, the air spring 12 associated with boarding and deboarding is not necessarily required to extend to the same height as the first vehicle height for the non-inclined vehicle body, and for example, the air spring 12 associated with boarding and deboarding may extend to 80% of the extension of the air spring 12 for the non-inclined vehicle body, and the air spring 12 not associated with boarding and deboarding may extend to 100% of the extension of the air spring 12 for the non-inclined vehicle body. The air spring 12 associated with boarding and deboarding may extend to 100% of the extension of the air spring 12 for the non-inclined vehicle body, and the air spring 12 not associated with boarding and deboarding may extend to 120% of the extension of the air spring 12 for the non-inclined vehicle body. In another example, the air spring 12 associated with boarding and deboarding may remain at the normal vehicle height (for example, second vehicle height), and the air spring 12 not associated with boarding and deboarding may change (for example, extend). In addition, the air spring 12 associated with boarding and deboarding may contract to a vehicle height lower than the normal vehicle height (for example, second vehicle height), and the air spring 12 not associated with boarding and deboarding may extend.

The air springs 12 on a right side and a left side of the vehicle body may be controlled separately from each other, or the air springs 12 may be individually controlled, so as to adjust the air springs 12 to the inclined vehicle height as the first vehicle height.

In another embodiment, when the air springs 12 are adjusted to the inclined vehicle height, a seat may be inclined upward toward the outside of the door. That is, an inner side of the seating surface of the seat in the lateral direction of the vehicle body may be lower than an outer side thereof. At this time, a holding feel for the seat improves. As a result, the occupant has more comfort when boarding and deboarding the vehicle.

The operation of the vehicle height adjustment apparatus 10 of the embodiment for improving boarding and deboarding characteristics will be described with reference to flowcharts in FIGS. 5 to 7. In the description of the examples illustrated in FIGS. 5 to 7, it is assumed that a sedan vehicle equipped with the vehicle height adjustment apparatus 10 is initially set to the second vehicle height suitable for travelling, and the second vehicle height is lower than the first vehicle height.

Figure 5:
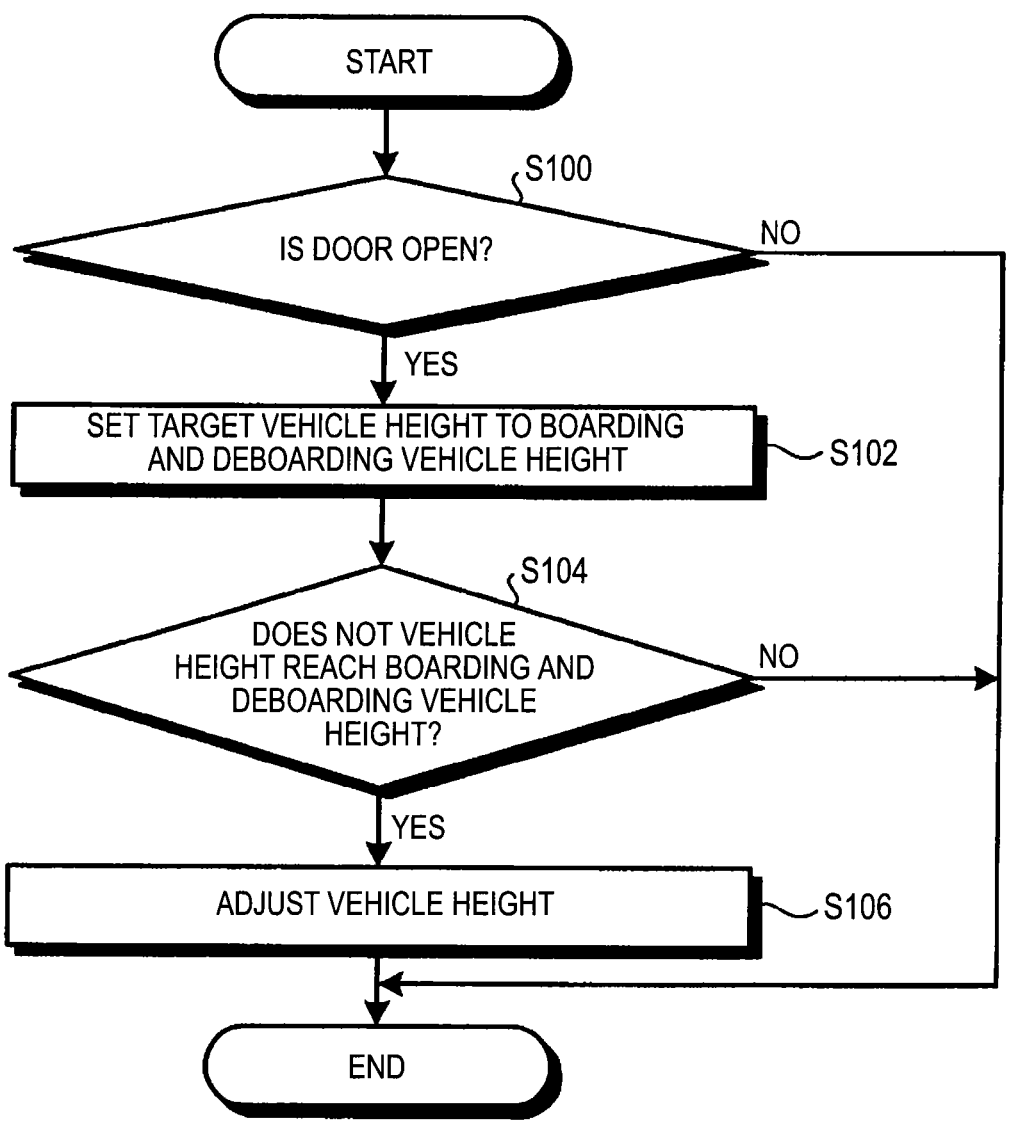
FIG. 5 is a flowchart illustrating how the vehicle height adjustment apparatus according to the embodiment simultaneously performs vehicle height control operations for four wheels so as to improve boarding and deboarding characteristics.

FIG. 5 illustrates an example in which vehicle height control operations (uniformly increasing control) for four wheels are simultaneously performed. For example, the ECU 56 acquires the preparation information indicative of the transition of a preparation state to at least one of the boarding preparation state and the deboarding preparation state via a CAN or the like for a constant control period. For example, when the door open information is acquired as the preparation information (Y in S100), a target vehicle height for the air spring 12 is set to the boarding and deboarding vehicle height, that is, the first vehicle height (S102). When the air spring 12 does not reach the boarding and deboarding vehicle height (first vehicle height) (Y in S104), the ECU 56 allows the working fluid to move from the pressure tank 26 toward the air spring 12, and performs a vehicle height adjustment process in which the air spring 12 is adjusted to increase to the first vehicle height via the extension thereof (S106). This process is repeated until the air spring 12 reaches the set first vehicle height, and when the air spring 12 reaches the first vehicle height, the ECU 56 ends this flow.

When the air spring 12 is adjusted to the first vehicle height, and a pressure difference between the pressure tank 26 and the air spring 12 is sufficient enough to allow the working fluid to move to the air spring 12, the opening and closing valves are controlled to be brought into the states illustrated in FIG. 2. When the pressure difference is not sufficient, or becomes insufficient during the movement of the working fluid, the opening and closing valves are controlled to be brought into the states illustrated in FIG. 3.

When the ECU 56 does not acquire the preparation information (door open information) in S100 (N in S100), the ECU 56 ends this flow. When the air spring 12 already reaches the boarding and deboarding vehicle height (first vehicle height) in S104 (N in S104), the ECU 56 ends this flow.

In a subsequent example, a right and left wheel independent vehicle height control (one side control) operation is performed. For example, the ECU 56 acquires the preparation information indicative of the transition of a preparation state to at least one of the boarding preparation state and the deboarding preparation state via a CAN or the like for a constant control period. At this time, for example, when right door open information is acquired as the preparation information (Y in S200), a target vehicle height for each of the air springs 12FR and 12RR is set to the boarding and deboarding vehicle height, that is, the first vehicle height (S202). In contrast, when the ECU 56 does not acquire the right door open information in S200 (N in S200), that is, when the ECU 56 acquires left door open information (Y in S204), a target vehicle height for each of the air springs 12FL and 12RL is set to the boarding and deboarding vehicle height, that is, the first vehicle height (S206). When the ECU 56 does not also acquire the left door open information in S204 (N in S204), the ECU 56 ends this flow.

When a target vehicle height is set to the first vehicle height, and the vehicle height for the set air spring 12 does not reach the boarding and deboarding vehicle height (first vehicle height) in S202 or S206 (Y in S208), the ECU 56 allows the working fluid to move from the pressure tank 26 to the air spring 12 that does not reach the boarding and deboarding vehicle height (first vehicle height), and performs a vehicle height adjustment process in which the target air spring 12 is adjusted to increase to the predetermined first vehicle height via the extension thereof (S210). This process is repeated until the air spring 12 reaches the set first vehicle height, and when the air spring 12 reaches the first vehicle height, the ECU 56 ends this flow.

When the air spring 12 is adjusted to the first vehicle height, and a pressure difference between the pressure tank 26 and the air spring 12 is sufficient enough to allow the working fluid to move to the air spring 12, the opening and closing valves are controlled to be brought into the states illustrated in FIG. 2. When the pressure difference is not sufficient, or becomes insufficient during the movement of the working fluid, the opening and closing valves are controlled to be brought into the states illustrated in FIG. 3.

When the air spring 12 already reaches the boarding and deboarding vehicle height (first vehicle height) in S208 (N in S208), the ECU 56 ends this flow.

Figure 6:
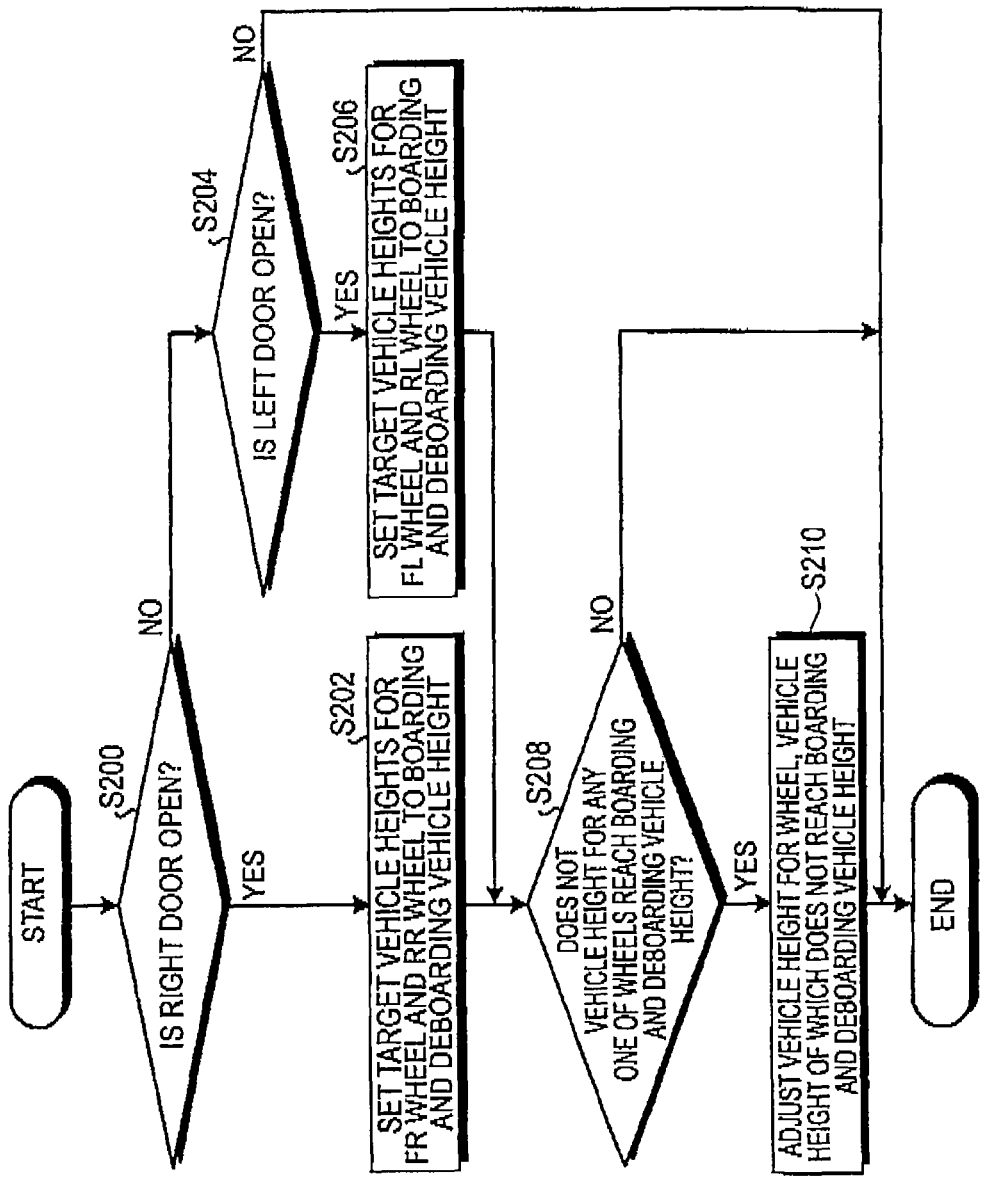
FIG. 6 is a flowchart illustrating how the vehicle height adjustment apparatus according to the embodiment independently performs vehicle height control operations for right and left wheels so as to improve boarding and deboarding characteristics.

When the air spring 12 is adjusted to the inclined vehicle height, the ECU 56 additionally performs only a vehicle height setting process for the air spring 12 not associated with boarding and deboarding so as to form an inclined state, and basically performs the same process as that illustrated in FIG. 6.

It is possible to reduce a burden on the occupant in boarding and deboarding the vehicle by adjusting the air spring 12 to the first vehicle height before boarding and deboarding the vehicle, thereby improving boarding and deboarding characteristics. In the description of the examples illustrated in FIGS. 5 and 6, the door open information is used as the preparation information, but even when other information, for example, the door unlocking information is used as the preparation information, it is possible to obtain the same effects via the same process.

FIG. 7 is a flowchart illustrating a case in which the air spring 12 is controlled to return back to the travelling vehicle height (second vehicle height) after the vehicle height is adjusted to the first vehicle height for boarding. Even in this case, it is assumed that the first vehicle height is greater than the second vehicle height. Since the travelling vehicle height (second vehicle height) is a vehicle height suitable for travelling, and basically, the vehicle heights for four wheels are simultaneously adjusted, the process illustrated in FIG. 7 can be applied to the case in which the air springs 12 in any state illustrated in FIG. 5 or 6 are adjusted to the second vehicle height.

For example, the ECU 56 acquires the completion information indicative of the completion of boarding via a CAN or the like for a constant control period. For example, when the ECU 56 acquires information (for example, vehicle speed>0 km/h) indicating that the vehicle starts travelling (Y in S300), the ECU 56 sets a target vehicle height for the air spring 12 to the normal vehicle height (travelling vehicle height), that is, the second vehicle height (S302). When the air spring 12 does not reach the normal vehicle height (second vehicle height) (Y in S304), the ECU 56 controls the opening and closing of the opening and closing valves as illustrated in FIG. 4, and the compressor 36 draws the working fluid from the air spring 12 and moves the working fluid to the pressure tank 26. That is, the air spring 12 is controlled to contract by the ECU 56, and thus the vehicle height is adjusted to become the second vehicle height (S306). This process is repeated until the air springs 12 reach the set second vehicle height, and when the air springs 12 reach the second vehicle height, the ECU 56 ends this flow to each of the air springs 12.

When the ECU 56 does not acquire the completion information (for example, vehicle speed>0 km/h) in S300 (N in S300), the ECU 56 ends this flow. When the air spring 12 already reaches the boarding and deboarding vehicle height (second vehicle height) in S304 (N in S304), the ECU 56 ends this flow.

The following information can also be used as the completion information: seat belt locking information; the shift information indicative of the transition of a shift position to a drive (forward travelling states such as D, 1, 2, or the like) or a reverse (R); parking brake release information indicative of the release of the parking brake, or the like, and it is possible to perform the same control.

As such, when the boarding is completed, the air spring 12 returns back to a vehicle height suitable for travelling, that is, the vehicle body returns back to a stable posture, and travelling stability is secured.

When the vehicle height is adjusted to the first vehicle height for deboarding and the deboarding is completed, it is assumed that the vehicle comes into a resting state (parking and stopping state). At this time, when the vehicle height remains at the first vehicle height, that is, is different from the normal vehicle height, the attractiveness of the vehicle may deteriorate (the vehicle may cause discomfort). For this reason, after the vehicle height adjustment apparatus 10 of the embodiment adjusts the vehicle height to the first vehicle height, the vehicle height adjustment apparatus 10 may acquire the completion information indicative of the completion of deboarding. For example, when the vehicle height is adjusted to the first vehicle height, and then a predetermined time elapses, the ECU 56 may consider that the completion information is acquired, and execute the processes following S302 in FIG. 7, and a process of returning the air spring 12 to the second vehicle height. At this time, after the deboarding is completed, the air spring 12 is adjusted to the second vehicle height, in other words, the vehicle has the most stable posture, and the posture of the vehicle transitions into the most beautiful silhouette, and thus the vehicle while parked becomes attractive, and the vehicle can also be stably parked and stopped.

Each of the flowcharts illustrates the case in which the vehicle height adjustment apparatus 10 is mounted in a sedan vehicle or the like, that is, the case in which the first vehicle height is set to be greater than the second vehicle height. In another example, for example, the vehicle height adjustment apparatus 10 of the embodiment can be applied to an SUV or the like. At this time, in the flowcharts, the first vehicle height is simply set to be lower than the second vehicle height. Accordingly, the processes in the flowcharts are the same, and it is possible to obtain the same effects.

The vehicle height adjustment apparatus 10 of the embodiment includes a total of four of the first opening and closing valve 24a, the second opening and closing valve 24b, the third opening and closing valve 24c, and the fourth opening and closing valve 24d, and switches the flow passage of the working fluid. As illustrated in FIGS. 1 to 4, each of the first opening and closing valve 24a, the second opening and closing valve 24b, the third opening and closing valve 24c, and the fourth opening and closing valve 24d can adopt a two-port opening and closing valve that has a simple configuration and is relatively cheap. As illustrated in FIGS. 2 to 4, it is possible to switch the flow mode (flow passage or flow direction) of the working fluid by changing the combination of the respective opening and closing states of the first opening and closing valve 24a, the second opening and closing valve 24b, the third opening and closing valve 24c, and the fourth opening and closing valve 24d, and obtain a cost reduction or a simplified design of the flow passage.

The embodiment illustrates the example in which when the vehicle height increasing control operation is performed, the ECU 56 selects at least one of the first and second flow passage systems, the first flow passage system being formed when the first opening and closing valve 24a and the fourth opening and closing valve 24d are opened, and the second flow passage system being formed when the second opening and closing valve 24b and the third opening and closing valve 24c are opened. In another embodiment, when the vehicle height increasing control operation is performed, the ECU 56 may use both of the first and second flow passage systems at all times. At this time, it is possible to improve the ease of flow of the working fluid, increase the vehicle height increasing speed compared to the case in which any one of the first and second flow passage systems is selected, and quickly adjust the vehicle height. It is not necessary to selectively control the opening and closing valves of the circuit valve block 24 when the vehicle height increasing control operation is performed, and a control logic becomes simplified.

In the example illustrated in each of the embodiments, when the vehicle height adjustment control operation (increasing control operation or decreasing control operation) is performed, the vehicle height adjustment apparatus 10 increases or decreases the air springs 12 simultaneously, but the air springs 12 may be adjusted by individually controlling the respective vehicle height adjustment valves 14. For example, when the working fluid is supplied with the rear wheel valve unit 18b being closed and the front wheel valve unit 18a being opened, it is possible to adjust the vehicle height for only the front wheels via the respective air springs 12FR and 12FL of the front wheels. Similarly, when the working fluid is supplied with the front wheel valve unit 18a being closed and the rear wheel valve unit 18b being opened, it is possible to adjust the vehicle height for only the rear wheels via the respective air springs 12RR and 12RL of the rear wheels. When the working fluid is supplied with the vehicle height adjustment valves 14FR and 14RR being opened and the vehicle height adjustment valves 14FL and 14RL being closed, it is possible to adjust the vehicle height for only the respective air springs 12FR and 12RR of the right wheels. In contrast, when the working fluid is supplied with the vehicle height adjustment valves 14FL and 14RL being opened and the vehicle height adjustment valves 14FR and 14RR being closed, it is possible to adjust the vehicle height for only the respective air springs 12FL and 12RL of the left wheels. Even at this time, since it is possible to adjust the vehicle height adjustment speed by the selection of the first flow passage system and/or the second flow passage system of the circuit valve block 24, it is possible to obtain the same effects as when the vehicle height is simultaneously adjusted for the four wheels.

The embodiment illustrates the closed type vehicle height adjustment apparatus 10. However, this disclosure can also be applied to substantially the same apparatus, for example, an apparatus that suctions the atmosphere (external air), compresses the atmosphere using the compressor 36, and supplies the atmosphere to the air spring 12 via the pressure tank 26, and it is possible to obtain the same effects. This disclosure can be applied to an apparatus that supplies the working fluid from the compressor 36 to the air spring 12 without passing through the pressure tank 26, and it is possible to obtain the same effects.

An aspect of this disclosure is directed a vehicle height adjustment apparatus including a plurality of vehicle height adjustment units that are respectively provided to correspond to wheels of a vehicle body, and adjust a vehicle height in response to the supply and discharge of a working fluid; a supply source of the working fluid; a plurality of opening and closing valves that are interposed between the vehicle height adjustment units and the supply source; and a control unit that adjusts a vehicle height for each of the vehicle height adjustment units to at least one of a first vehicle height suitable for at least one of boarding and deboarding, and a second vehicle height suitable for travelling. When the control unit acquires preparation information indicative of the transition of a preparation state to at least one of a boarding preparation state and a deboarding preparation state, the control unit adjusts the vehicle height adjustment units from the second vehicle height to the first vehicle height. According to this embodiment, it is possible to improve boarding and deboarding characteristics via a simple control operation in which the vehicle height adjustment units are adjusted from the second vehicle height to the first vehicle height, upon the acquisition of the preparation information indicative of a state (boarding preparation state or deboarding preparation state) in which an occupant prepares to board a vehicle, or the occupant prepares to deboard the vehicle.

In the vehicle height adjustment apparatus according to the aspect of this disclosure, the control unit may acquire at least one of door open information and door unlocking information as the preparation information indicative of the boarding preparation state. According to this embodiment, since the preparation information is a typical operation that the occupant performs for boarding, it is possible to adjust the vehicle height adjustment units to a vehicle height suitable for boarding at an appropriate timing, while reducing a cost increase or the complexity of the apparatus.

In the vehicle height adjustment apparatus according to the aspect of this disclosure, the control unit may acquire at least one of the door open information, the door unlocking information, seat belt release information, shift information, parking brake information, and vehicle power source OFF information as the preparation information indicative of the deboarding preparation state. According to this embodiment, since the preparation information is a typical operation that the occupant performs for deboarding, it is possible to adjust the vehicle height adjustment units to a vehicle height suitable for boarding at an appropriate timing, while reducing a cost increase or the complexity of the apparatus.

In the vehicle height adjustment apparatus according to the aspect of this disclosure, when the control unit acquires the preparation information, the control unit may adjust a vehicle height for the vehicle height adjustment unit that corresponds to a door associated with the preparation information. According to this embodiment, for example, since a vehicle height for the vehicle height adjustment unit at the position of a door to be opened and closed, that is, the position of a door used by the occupant is adjusted, it is possible to improve boarding and deboarding characteristics, and achieve control refinement and control optimization.

In the vehicle height adjustment apparatus according to the aspect of this disclosure, when the control unit adjusts the vehicle height adjustment units to the first vehicle height, the vehicle body may be inclined in a lateral direction of a vehicle. According to this embodiment, for example, when a seat for boarding and deboarding used by the occupant is inclined downward toward the outside of the door, it is possible for the occupant to smoothly board or deboard the vehicle. In contrast, when the seat is inclined upward toward the outside of the door, a holding feel for the seat improves, and the occupant has more comfort when boarding and deboarding the vehicle.

In the vehicle height adjustment apparatus according to the aspect of this disclosure, when the control unit acquires completion information indicative of the completion of boarding or the completion of deboarding, the control unit may adjust the vehicle height adjustment units from the first vehicle height to the second vehicle height. According to this embodiment, when boarding or deboarding is completed, the vehicle height adjustment units are adjusted to a vehicle height suitable for travelling, that is, the vehicle body returns back to a stable posture, and the vehicle is allowed to stably travel, park or stop.

In the vehicle height adjustment apparatus according to the aspect of this disclosure, the supply source may include a pressure tank that stores the working fluid, and a compressor that pressure-feeds the working fluid. The plurality of opening and closing valves may include first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit. When the working fluid flows from the pressure tank toward the vehicle height adjustment unit due to a pressure difference therebetween, the control unit may select at least one of a first flow passage system that is formed when the first and fourth opening and closing valves are opened, and a second flow passage system that is formed when the second and third opening and closing valves are opened. According to the aspect of this disclosure, with a simple configuration, boarding and deboarding characteristics improve. It is possible to switch the ease of flow of the working fluid (flow rate of the working fluid) per a unit time period by selecting the first flow passage system or the second flow passage system, or selecting both of the first and second flow passage systems.

It is possible to increase and decrease a vehicle height increasing speed or switch the vehicle height increasing speed by switching the opening and closing states of the opening and closing valves.

In the vehicle height adjustment apparatus according to the aspect of this disclosure, the supply source may include a pressure tank that stores the working fluid, and a compressor that pressure-feeds the working fluid. The plurality of opening and closing valves may include first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit. When the working fluid flows from the pressure tank toward the vehicle height adjustment unit due to a pressure difference therebetween, the control unit may use a first flow passage system that is formed when the first and fourth opening and closing valves are opened, and a second flow passage system that is formed when the second and third opening and closing valves are opened. According to the aspect of this disclosure, with a simple configuration, boarding and deboarding characteristics improve. It is possible to improve the ease of flow of the working fluid (flow rate of the working fluid) per a unit time period, and quickly perform the vehicle height increasing control operation by using both of the first and second flow passage systems.

In the vehicle height adjustment apparatus according to the aspect of this disclosure, a fluid regeneration apparatus and a throttle mechanism may be disposed at the outlet of the compressor, and the second end of the second opening and closing valve and the first end of the third opening and closing valve may be connected to each other and the throttle mechanism. According to the aspect of this disclosure, with a simple configuration, boarding and deboarding characteristics improve. Even in a case where the fluid regeneration apparatus is disposed in a flow passage so as to maintain the quality of the working fluid, when the working fluid flows from the pressure tank toward the vehicle height adjustment unit due to a pressure difference therebetween, the working fluid can flow from the second opening and closing valve toward the third opening and closing valve without passing through the fluid regeneration apparatus and the throttle mechanism at the outlet of the compressor which is one of the causes of pressure loss. As a result, it is possible to prevent a decrease in the vehicle height adjustment speed.

The embodiment and modification examples of this disclosure are described, but are presented just as examples, and are not intended to limit the scope of this disclosure. This new embodiment can be implemented in various forms, and omissions, replacements, and changes can be made to this disclosure in various forms insofar as the omissions, the replacements, and the changes do not depart from the scope of this disclosure. The embodiment or the modifications are included in the scope or the essentials of this disclosure, and included in this disclosure disclosed in the claims and the equivalent range thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle height adjustment apparatus comprising:
   a plurality of vehicle height adjustment units that are respectively provided to correspond to wheels of a vehicle body, and adjust a vehicle height in response to the supply and discharge of a working fluid;
   a supply source of the working fluid;
   a plurality of opening and closing valves that are interposed between the vehicle height adjustment units and the supply source; and
   a control unit that adjusts a vehicle height for each of the vehicle height adjustment units to at least one of a first vehicle height suitable for at least one of boarding and deboarding, and a second vehicle height suitable for travelling,
   wherein when the control unit acquires preparation information indicative of the transition of a preparation state to at least one of a boarding preparation state and a deboarding preparation state, the control unit adjusts the vehicle height adjustment units from the second vehicle height to the first vehicle height,
   wherein the supply source includes a pressure tank that stores the working fluid, and a compressor that pressure-feeds the working fluid,
   the plurality of opening and closing valves includes first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit, and
   when the working fluid flows from the pressure tank to the vehicle height adjustment unit due to a pressure difference therebetween, the control unit selects at least one of a first flow passage system that is formed when the first and fourth opening and closing valves are opened, and a second flow passage system that is formed when the second and third opening and closing valves are opened.

2. The vehicle height adjustment apparatus according to claim 1,
   wherein the control unit acquires at least one of door open information and door unlocking information as the preparation information indicative of the boarding preparation state.

3. The vehicle height adjustment apparatus according to claim 1,
   wherein the control unit acquires at least one of door open information, door unlocking information, seat belt release information, shift information, parking brake information, and vehicle power source OFF information as the preparation information indicative of the deboarding preparation state.

4. The vehicle height adjustment apparatus according to claim 1,
   wherein when the control unit acquires the preparation information, the control unit adjusts a vehicle height for the vehicle height adjustment unit that corresponds to a door associated with the preparation information.

5. The vehicle height adjustment apparatus according to claim 1,
wherein when the control unit adjusts the vehicle height adjustment units to the first vehicle height, the vehicle body is inclined in a lateral direction of a vehicle.

6. The vehicle height adjustment apparatus according to claim 1,
wherein when the control unit acquires completion information indicative of the completion of boarding or the completion of deboarding, the control unit adjusts the vehicle height adjustment units from the first vehicle height to the second vehicle height.

7. The vehicle height adjustment apparatus according to claim 1,
wherein a fluid regeneration apparatus and a throttle mechanism are disposed at the outlet of the compressor, and the second end of the second opening and closing valve and the first end of the third opening and closing valve are connected to each other and the throttle mechanism.

8. A vehicle height adjustment apparatus comprising:
a plurality of vehicle height adjustment units that are respectively provided to correspond to wheels of a vehicle body, and adjust a vehicle height in response to the supply and discharge of a working fluid;
a supply source of the working fluid;
a plurality of opening and closing valves that are interposed between the vehicle height adjustment units and the supply source; and
a control unit that adjusts a vehicle height for each of the vehicle height adjustment units to at least one of a first vehicle height suitable for at least one of boarding and deboarding, and a second vehicle height suitable for travelling,
wherein when the control unit acquires preparation information indicative of the transition of a preparation state to at least one of a boarding preparation state and a deboarding preparation state, the control unit adjusts the vehicle height adjustment units from the second vehicle height to the first vehicle height,
wherein the supply source includes a pressure tank that stores the working fluid, and a compressor that pressure-feeds the working fluid,
the plurality of opening and closing valves includes first and second opening and closing valves, a first end of each of which is connected to the pressure tank; a third opening and closing valve, a first end of which is connected to an outlet of the compressor and a second end of the second opening and closing valve, and a second end of which is connected to the vehicle height adjustment unit; and a fourth opening and closing valve, a first end of which is connected to an inlet of the compressor and a second end of the first opening and closing valve, and a second end of which is connected to the vehicle height adjustment unit, and
when the working fluid flows from the pressure tank toward the vehicle height adjustment unit due to a pressure difference therebetween, the control unit uses a first flow passage system that is formed when the first and fourth opening and closing valves are opened, and a second flow passage system that is formed when the second and third opening and closing valves are opened.

9. The vehicle height adjustment apparatus according to claim 8,
wherein the control unit acquires at least one of door open information and door unlocking information as the preparation information indicative of the boarding preparation state.

10. The vehicle height adjustment apparatus according to claim 8,
wherein the control unit acquires at least one of door open information, door unlocking information, seat belt release information, shift information, parking brake information, and vehicle power source OFF information as the preparation information indicative of the deboarding preparation state.

11. The vehicle height adjustment apparatus according to claim 8,
wherein when the control unit acquires the preparation information, the control unit adjusts a vehicle height for the vehicle height adjustment unit that corresponds to a door associated with the preparation information.

12. The vehicle height adjustment apparatus according to claim 8,
wherein when the control unit adjusts the vehicle height adjustment units to the first vehicle height, the vehicle body is inclined in a lateral direction of a vehicle.

13. The vehicle height adjustment apparatus according to claim 8,
wherein when the control unit acquires completion information indicative of the completion of boarding or the completion of deboarding, the control unit adjusts the vehicle height adjustment units from the first vehicle height to the second vehicle height.

\* \* \* \* \*